(No Model.)
F. O. ROGERS
ROOF FENDER.
No. 302,429. Patented July 22, 1884.
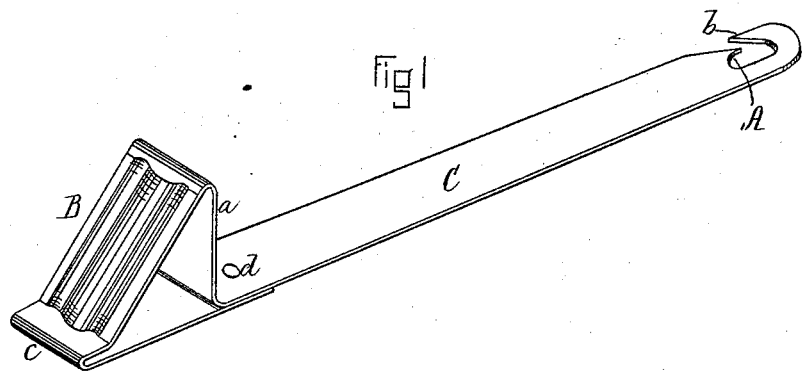
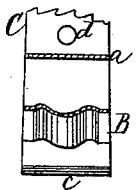
WITNESSES
James J. D. Bogan
J. W. Clark
INVENTOR
Frederick O. Rogers

UNITED STATES PATENT OFFICE.

FREDERICK O. ROGERS, OF BOSTON, MASSACHUSETTS.

ROOF-FENDER.

SPECIFICATION forming part of Letters Patent No. 302,429, dated July 22, 1884.

Application filed January 10, 1884. (No model.)

*To all whom it may concern:*

Be it known that I, FREDERICK O. ROGERS, of Boston, in the county of Suffolk and State of Massachusetts, have invented a new and useful Improvement in the Roof-Fender for which Letters Patent were issued to me dated December 5, 1876, No. 185,137, to which patent on file I beg leave to refer, of which the following is a full, clear, and exact description, reference being had to the accompanying drawings, making part of this specification, in which—

Figure 1 is a view representing a snow-fender for preventing snow-slides from roofs, including my improvement over the old fender represented in said patent; and Fig. 2 is a sectional detail of the same.

The improvement consists of the inside counter-hook, A, and the corrugated brace part of the V-shaped projection B, as shown in Figs. 1 and 2.

My improved fender is made from a strip, C, of galvanized iron or other suitable metal, one end of which is provided with a hook, b, engaging the nail holding the slate or shingle, and a counter-hook, A. The opposite end of this fender is bent in the form seen in Fig. 1, to form a guard, a, to prevent the snow from falling from the roof, the rear portion of this guard being corrugated, as seen, forming a brace, B, while the lower portion of the brace is bent at c in the direction of the length of the strip C, and its end is riveted at d or otherwise secured thereto. The inside counter-hook, A, (seen in Fig. 1,) prevents the main hook hooked onto the nail holding the slate from unhooking by reason of any pressure up against it by accident or by the wind acting upon the V-shaped projection, and the corrugation of the V-shaped projection in the brace part thereof, as shown at B in Figs. 1 and 2, greatly stiffens and strengthens the V-shaped projection, to form an effective barrier to hold the snow and ice, and prevent them from sliding from the roof, thus enabling the manufacturer to use much thinner galvanized iron or other suitable material in making the V-shaped projection of the fender, so that in fact the V-shaped projection can be made of the same thin iron or other material as the upper end is made of, with the main hook and the inside counter-hook thereon, and still be sufficiently stiff and strong to hold the pressing snow and ice, and, indeed, making it stiffer and stronger than thicker and heavier material that is not corrugated. By my improvement in corrugating the brace part of the V-shaped projection the whole fender may be made of one and the same thin strip, saving in weight of material and expense, and thus dispenses with the necessity of riveting thicker and thinner materials together for the sake of obtaining more strength in the brace part.

I do not claim the hook and fender as shown in Letters Patent No. 185,137, issued to me December 5, A. D. 1876; but

What I claim as my invention and improvement, and desire to secure by Letters Patent, is—

1. The fender herein described, having the counter inside hook, A, constructed substantially as shown and described, and for the purposes set forth.

2. The roof-fender herein described, having the brace part of the V portion corrugated, as shown, for the purposes described.

Witness my hand this 4th day of January, A. D. 1884.

FREDERICK O. ROGERS.

In presence of—
CHARLES W. TURNER,
L. L. SCAIFE.